United States Patent [19]

Steffes

[11] Patent Number: 5,086,493
[45] Date of Patent: Feb. 4, 1992

[54] ELECTRIC THERMAL STORAGE BOOSTED HEAT PUMP AIR HEATING APPARATUS

[76] Inventor: Paul J. Steffes, 1282 Fairway, Dickinson, N. Dak. 58601

[21] Appl. No.: 478,211

[22] Filed: Feb. 9, 1990

[51] Int. Cl.[5] .......................... H05B 1/02; F24H 7/04
[52] U.S. Cl. .................................. 392/307; 62/430; 126/400; 165/18; 392/344; 392/346
[58] Field of Search ............... 219/378, 341, 365; 126/400; 392/339–346, 307; 165/18; 62/430

[56] References Cited

U.S. PATENT DOCUMENTS

| | | | |
|---|---|---|---|
| 2,723,083 | 11/1955 | Bary | 165/18 X |
| 2,856,506 | 10/1958 | Telkes . | |
| 3,292,854 | 12/1966 | Webb | 219/378 X |
| 3,301,251 | 1/1967 | Jackson | 126/400 |
| 3,885,126 | 5/1975 | Sugiyama et al. | 219/365 |
| 3,975,620 | 8/1976 | Hallgreen et al. | 219/364 |
| 3,989,927 | 11/1976 | Erb | 219/378 |
| 4,012,920 | 3/1977 | Kirschbaum | 62/2 |
| 4,042,012 | 8/1977 | Perry et al. | 165/1 |
| 4,234,782 | 11/1980 | Barabas et al. | 219/378 X |
| 4,345,639 | 8/1982 | Lane | 219/378 X |

FOREIGN PATENT DOCUMENTS

| | | | |
|---|---|---|---|
| 657973 | 2/1963 | Canada | 219/365 |
| 1138911 | 10/1962 | Fed. Rep. of Germany | 219/378 |
| 3442085 | 5/1986 | Fed. Rep. of Germany | 219/378 |
| 42973 | 9/1970 | Finland | 219/378 |
| 914075 | 6/1946 | France | 219/365 |
| 2310535 | 12/1976 | France | 219/365 |
| 984992 | 3/1965 | United Kingdom | 219/365 |
| 1026245 | 4/1966 | United Kingdom | 219/378 |
| 1064378 | 4/1967 | United Kingdom | 219/378 |
| 1071781 | 6/1967 | United Kingdom | 219/378 |
| 1238854 | 7/1971 | United Kingdom | 219/365 |
| 1273602 | 5/1972 | United Kingdom | 219/365 |
| 2124748 | 2/1984 | United Kingdom | 392/346 |

Primary Examiner—Anthony Bartis
Attorney, Agent, or Firm—Palmatier & Sjoquist

[57] ABSTRACT

An electric thermal storage heater with a heat storage brick assembly enclosed within an insulating sheath and an outer shell or housing; there is a space between the outer shell and the insulating sheath through which low temperature air is passed; the brick assembly has air flow openings therethrough into which the electric heating elements may be slipped during installation, and the openings communicate with entrance and exit passages which supply air to and through the brick assembly; air valving is provided to close and modulate the air flowing through the brick assembly and through the low temperature air path; the heating elements maintain the temperature of the bricks between 500° F. and 1300° F., depending upon the expected heating load; and air ducts and a fan move air from the storage heater to the duct system of a heat pump or similar forced air heating device.

10 Claims, 3 Drawing Sheets

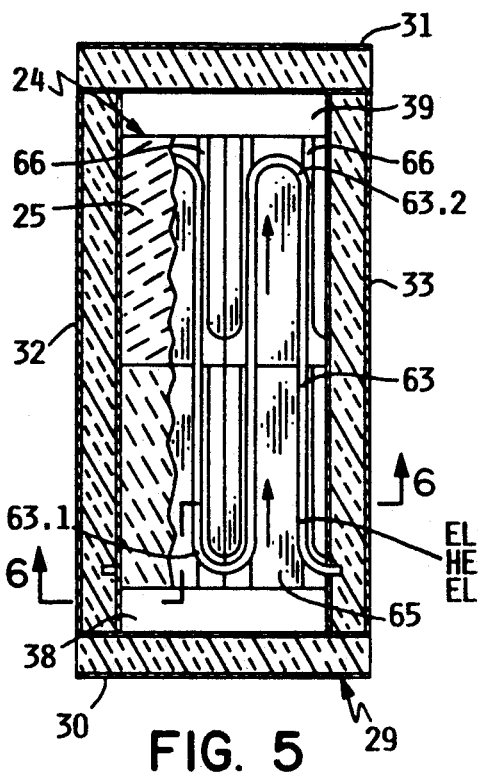

5,086,493

ELECTRIC THERMAL STORAGE BOOSTED HEAT PUMP AIR HEATING APPARATUS

This invention relates to a heat storage device, and more particularly a heat storage device for providing supplemental heat and adding to the temperature of forced air from a heat pump or other similar forced air device.

BACKGROUND OF THE INVENTION

Heat storage devices have been known previously and are useful for space heating, particularly where the source of heat is electrical energy. Unfortunately, demand for heat oftentimes occurs at the same time at which other loads are at a maximum, and during times of peak loads, the power companies supplying the electricity will charge a maximum price for their electricity. The heat storing devices allow electricity to be used for generating of heat during off peak hours when the cost of electricity is substantially less than at times of maximum heating load. The heat may be stored for a few hours and then used to heat a room.

One form of heat storing device is disclosed in the Telkes U.S. Pat. No. 2,856,506 which illustrates the possibility of heating blocks of anhydrous sodium sulfate which are used as a heat storage device. Heating occurs with either electrical resistance heaters or with a fuel fired source of heat.

The Jackson U.S. Pat. No. 3,301,251 shows another form of heat storage device with a central opening and metal fins for heating air passing through the opening; the fins being heated by the storage block, and the blocks are heated by a number of resistance heaters laid in grooves between adjacent blocks.

Other forms of heat accumulators and heat storing devices are illustrated in U.S. Pat. Nos. 3,885,126, 3,975,620, and 3,989,927.

Typical heat pump devices are illustrated in U.S. Pat. Nos. 4,012,920 and 4,042,012.

SUMMARY OF THE INVENTION

An object of the invention is to provide a heat booster to provide inexpensive heat and higher temperature air to supplement the oftentimes inadequate capabilities of a heat pump or other source of forced air heat for heating spaces within a building.

Another object of the invention is to provide an electric thermal storage heater with an assembly of dense heat storage bricks accommodating ready and easy installation and removal of electric heating elements into the air passages of the brick assembly.

A feature of the invention is an electric thermal storage heater connected into the heated air discharge duct of a heat pump for increasing the temperatures of and adding heat to a portion of the heated air from the heat pump, by passing the portion of the air through and around an assembly of heat storage bricks preheated with low cost off-peak electrical energy, and modulating the proportion of air which is drawn through the heat storage bricks to regulate the amount of heat and temperature which is added to the output of the heat pump. The flow of air through the heat storage bricks is controlled by inlet and outlet valves operated by a damper motor, preferably a stepper motor. The valves may be entirely closed to prevent any air from moving through the heat storage bricks, to minimize dissipation of heat, and to prevent condensation of water in the brick assembly during the season when the heat pump is operated as an air conditioner for its cooling capability.

The brick assembly and the associated high temperature air passages adjoining the brick assembly are confined by an insulating sheath. Temperatures within the insulating sheath may be in the range of 1300° F. The outer shell or metal housing of the heater is spaced from the insulating sheath and defines a low temperature air passage or path which collects and carries away the small amount of heat which passes through the insulating sheath. The fan of the storage heater will operate at low speed continuously to move air through the low temperature air path whenever the heat pump fan is operating. Accordingly, the outer shell of the heater is maintained at near room temperature and is always safe to touch.

A pressure operated damper valve between the heat pump duct and the storage heater, opens in response to flow of air to and from the storage heater, but closes to isolate the storage heater from the heat pump duct when the heat pump is shut down.

The thermal storage heater is also useful with electric resistance heated, forced air furnaces, which may be subject to have electric power cut off for the resistance heating during peak load times.

Another feature of the invention is a brick array for an electric thermal storage heater wherein at least one face of each brick is shaped to confront the face of an adjoining brick and form an air passage therebetween. The same face is provided with an elevated shelf, adjoining the passage and carrying a length of the electric heating element. The element is carried in close proximity or engagement with the next adjoining brick. Heat from the electric heating element will penetrate both bricks. Adjoining side by side bricks have adjacent ledges which also traverse the ends of the bricks. A heating element bent into a planar serpentine or sinusoidal pattern may be inserted into the air passages between a number of bricks after the assembly has been created. Each brick incorporates elongate upstanding lands along its shelf at its sides to support the superposed brick thereon.

BRIEF DESCRIPTION OF THE DRAWINGS

FIG. 5 is a detailed section view taken approximately at 5—5 of FIG. 2.

FIG. 6 is a detailed section view taken along a broken line substantially at 6—6 of FIG. 5.

FIG. 7 is a detailed section view taken approximately at 7—7 of FIG. 1 and also at 7—7 of FIG. 8.

FIG. 8 is a detailed section view taken approximately at 8—8 of FIG. 7.

DETAILED SPECIFICATION

Figure 1:
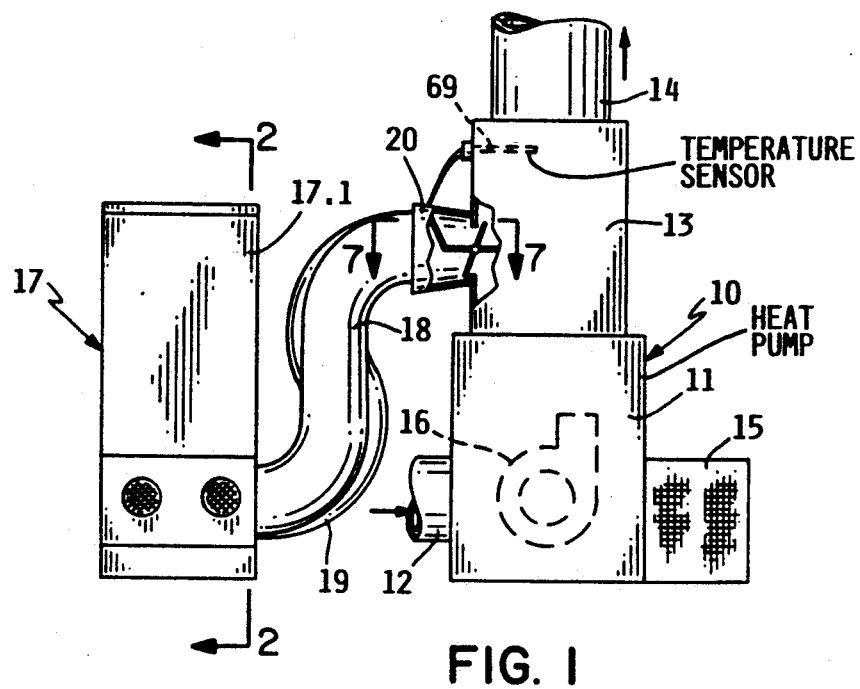
FIG. 1 is an elevation view of the general components of the present invention, a portion of the apparatus being broken away and shown in detail.
Figure 2:
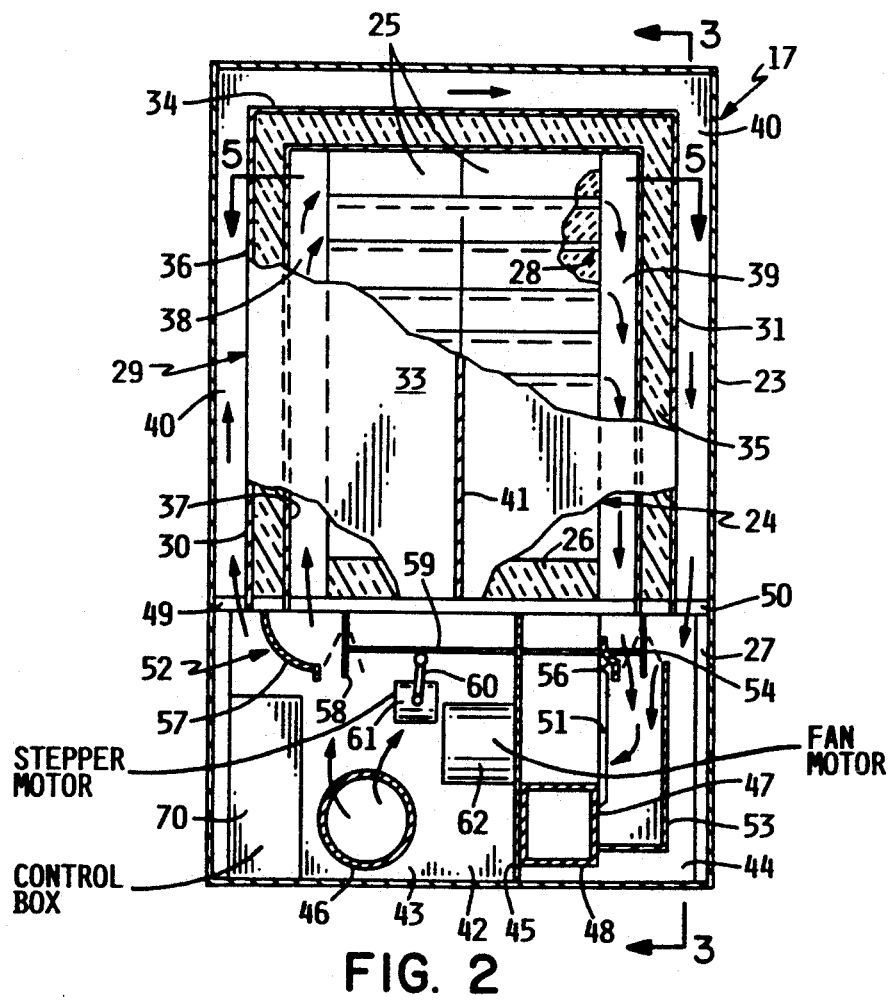
FIG. 2 is an enlarged detailed section view taken approximately at 2—2 of FIG. 1.
Figure 3:
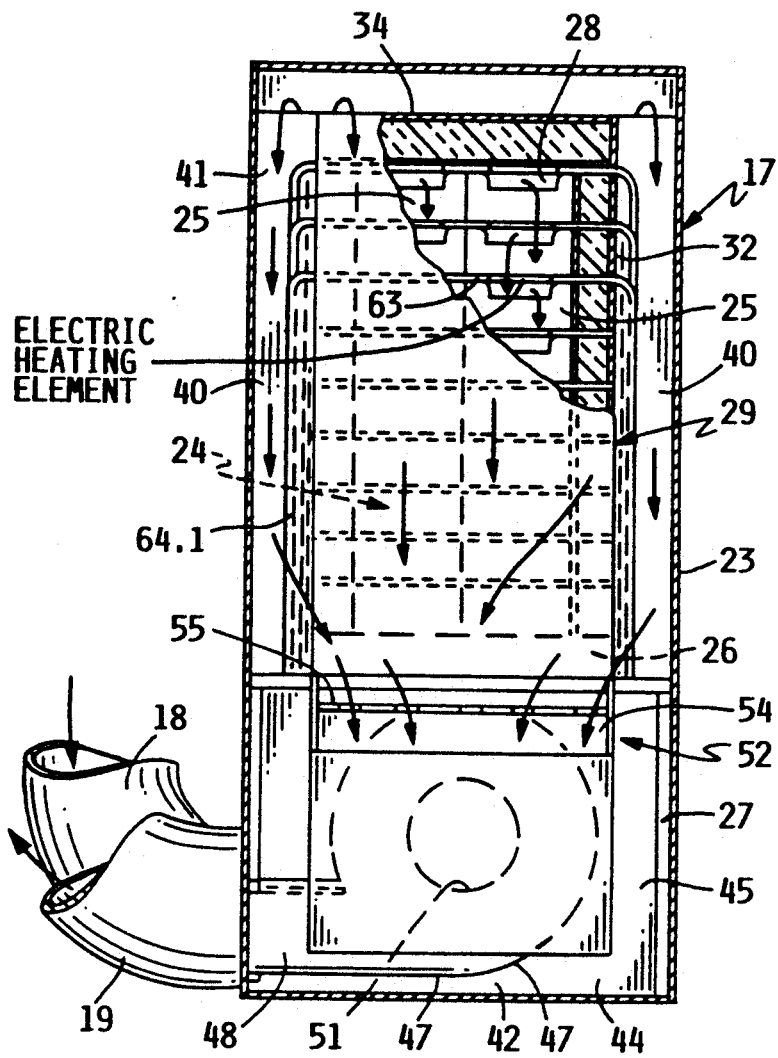
FIG. 3 is a detailed section view taken approximately at 3—3 of FIG. 2.

One form of the invention is illustrated in the drawings and is described herein.

In FIG. 1 a space heating heat pump is indicated in general by numeral 10 and has an air control unit 11 receiving cool air from the space being heated in a return duct 12; a plenum chamber 13 for air that has been heated by the heat pump, and a hot air 14 which will deliver heated air to the spaces being heated. The heat pump 10 has an evaporator-condenser 15 and an internal heat pump fan 16 for moving the air through the heat pump from the return duct 12 to the hot air duct 14.

An electric thermal storage heater, indicated in general by numeral 17, is placed adjacent to the heat pump 10 and is connected thereto by a pair of flexible and large diameter and large capacity air ducts 18 and 19.

The side-by-side ducts 18 and 19 are both connected to the heat pump plenum chamber 13 by a connector box through which air is drawn from the plenum for the inlet duct 18 and air is discharged from the storage heater 17 through the heated air duct 19. The connector box defines separate passages for the inlet air and the discharging air and has a damper valve 21 held in a normally closed position by a spring 22 which will yield under the force of air acting against the damper valve 21 which allows the damper valve to open slightly as specifically illustrated in FIG. 8.

Figure 4:
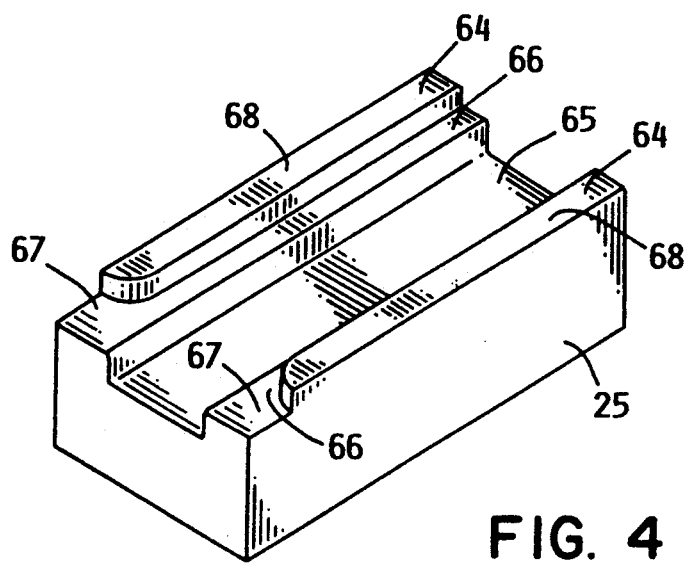
FIG. 4 is a perspective view illustrating one of the heat storage bricks.

The thermal storage heater 17 has a metal outer shell or housing 23 which forms a portion of an enclosure or enclosure means confining an assembly 24 of heat storage bricks 25. The shape of each of the bricks is illustrated in FIG. 4 and these generally rectangular bricks 25 are assembled in end-to-end and side-to-side relation with each other and are arranged in a number of courses or layers. Although the heat storage bricks may be formed of various types of material, applicant has found that a preferable form of heat storage brick is formed of finely ground magnetite ($F_3O_4$) pressed together and including a form of binder which may be a white plastic clay, a natural product, plus a small quantity of bentonite. The bricks may also include a lubricant component which is preferably in the form of a talc.

The assembly 24 of heat storage bricks is supported on a vermiculite insulation block 26 suitably supported on open framework 27 within the shell or housing 23.

The assembly of heat storage bricks has a multiplicity of air flow openings 28 through which air is drawn after the bricks have been heated for heating the air.

An insulated sheath 29 entirely surrounds the sides and top of the assembly 24 of heated bricks 25; and the insulating sheath 29 has front and back walls 30 and 31, and opposite sidewalls 32 and 33, and a top wall 34, all of which are joined together to form the sheath 29 and to tightly enclose the assembly 24 of bricks and to prevent the escape of any significant amounts of heat from the bricks.

All of the side and top walls of the insulating sheath 29 include a thickness of ceramic filler insulation 35, which is sandwiched between a pair of metal panels 36 and 37. The outer panel 36 forming the outer skin of the insulating sheath may be formed of galvanized sheet metal; and the inner metal panels 37 of all of the walls are formed of an aluminized steel, preferably 26 gauge steel, which is exposed to the heat of the bricks in the normal use of the thermal storage heater 17.

The front and rear walls 30 and 31 of the insulating sheath 29 are spaced from the thermal storage brick assembly 24, and more specifically, from the ends of the bricks 25 as to form entrance and exit air flow passages 38 and 39, respectively. The passages 38 and 39 communicate with the air flow openings 28 which traverse the heated brick assembly 24; and the air passages 38 and 39 open downwardly into spaces within the housing 23, as hereinafter more fully described.

The insulating sheath 29 is also spaced inwardly from the outer sheath or housing 23 so as to define a low temperature air path or passage 40 therebetween. The low temperature air passage 40 adjoins the outer surfaces of the front and back walls 30 and 31 and the top wall 34. Portions of the low temperature air path or passage 40 also extend along the sidewalls 32 and 33. Upright flow guide panels 41 between the sidewalls 32 and 33 and the outer sheath or housing 23 may be provided to direct air in the low temperature air passage 40. Both the entrance and exit ends of the low temperature air passage 40 open downwardly into spaces below the heat storage brick assembly 24 as hereinafter more fully described.

The lower portion of the shell or housing 23 defines an air controlling plenum which is separated into two distinct sections, an air inlet chamber 43 and a heated air discharge chamber 44. A panel 45 traverses the entire plenum 42 and separates the chambers 43 and 44 from each other as to prevent commingling of the air in the two chambers with each other.

The air inlet duct 18 is connected with the housing 23 and communicates with the inlet air chamber 43 by a fitting 46 carried in the wall of the housing 23.

The hot air duct 19 is also connected to the wall of the housing 23 and communicates with the fan 47 and particularly with the discharge duct 48 thereof.

The low temperature air path 40 communicates with the inlet air chamber 43 at 49, and the other end of the low temperature air passage 40 communicates with the hot air discharge chamber 44 at 50. The fan 47 will be operated at low speed whenever the fan 16 in the heat pump 10 is operated and when the temperature of the air in the brick assembly 24 is 500° Farenheit of more. When the fan is operating at low speed, the center air inlet 51 of the fan is in open communication with the chamber 44 so as to draw air from the low temperature passage 40. Any heat that permeates through the insulating sheath 29 will be carried away by the slow moving air in the passage 40. The low speed operation of the fan will slightly open the damper 21 as seen in FIG. 8.

Air control, indicated in general by numeral 52 is provided in the plenum 42 to control the flow of air through the entrance and exit passage 37, 39 and through the air flow openings 28 which traverse through the brick assembly 24. A box 53 confines the inlet 51 of the fan 47; and an air valve or panel 54 attached to the frame 27 is located to swing against the top edge of the sidewall of the box 53 to modulate or close against air flowing from the passage 40 into the fan. The air valve or panel 54 is hinged at 55 to also be adapted to swing against a closure lip 56 adjacent the fan inlet to close off or modulate the air flowing from the high temperature exit passage 39 into the box 53 and the fan 47.

The entrance air flow passage 38 is controlled by a stationary sheet metal housing shroud 57 against which an air valve or swinging panel 58 may swing. The air valve 58 will close access to the high temperature entrance passage 38 when the air valve 58 is closed and the air valve may be partially opened to modulate flow through the passage. Air valves 58 and 54 are connected together by an operating rod 59 which is pivotally connected to both of the air valves. The rod is connected to the drive arm 60 of a stepper motor 61 which may be slowly operated to open and close the valves 54, 58.

The motor 62 which operates the fan 47 protrudes through the barrier wall 45 and is disposed in the cool air inlet chamber 43.

The heat storage bricks 25 in the assembly 24 are heated by a multiplicity of electric resistance heating elements or strips 63 which are bent into a serpentine or sinusoidal pattern as seen in FIG. 5. The ends of the heating elements are shaped to pass between adjoining layers of insulation 35 in the walls of the insulating sheath and are connected with supply wires cumulatively identified by numeral 64.1, which extend along the low temperature air path and are maintained adequately cooled by the air flowing therein. It will be noted in FIG. 5, that the sinusoidal pattern of heating element 63 allows the heating element 63 to be confined wholly within the heat storage brick assembly 24 so that the bricks will quickly absorb the heat produced by the heating element.

With particular reference to FIGS. 4, 5 and 6, it will be recognized that the heat storage bricks 25 have flat and planar side surfaces, end surfaces and bottom surfaces. At the top of each of the bricks 25, the facing surface 64 has a channel-shaped recess 65 therein so as to cooperate with the bottom surface of the next adjoining brick to define the air flow openings 28 which traverse the assembly 24. As seen in FIG. 4, there is a pair of shelves or shelf surfaces 66 formed and extending along the opposite sides of the channel-shaped recess 65. The shelves 66 also have portions 67 at one end of each brick which traverse the end, of the brick. As seen in FIGS. 5 and 6, the shelves 66 support the electric resistance heating elements so that the heating element will lie on the shelves and be in engagement with or in close proximity to the surface of the brick superposed thereabove.

The side portions of each of the bricks 25 define upstanding lands or bar-shaped portions 68, which protrude above the shelves 66 all along the length of the brick to define the facing surfaces 64. The lands 68 will support the weight of the bricks above and maintain the recesses 65 unobstructed so that the air openings 28 will remain open. It will be recognized that the shapes of adjoining bricks follow the curvature of the bights 63.1 of the heating elements 63. Alternate bights 63.2 traverse the recesses 65, but are entirely enclosed within the sides of the brick assembly 24.

As seen in FIG. 1, a sensor 69 is mounted in the heat pump plenum 13, downstream of the inlet from the electric thermal storage heater 17 to sense the temperature of the air being supplied for space heating. The sensor 69, as well as the room thermostat in the spaces being heated, and sensors sensing the temperature of the brick assembly 24 are connected into controls confined within the control box 70 which controls the application of heat into the bricks of the assembly. Heating of the bricks is also coordinated with the ambient air temperature.

In obtaining the full use of the electric thermal storage heater, the brick assembly 24 may be heated as high into the range of 1300° F. to store heat as may be needed to supplement the heat supplied by the heat pump 10.

In operation, the fan 47 will be operated to circulate air through the low temperature air passages 40 whenever the fan 16 of the heat pump is energized and whenever the temperature of the brick assembly is 500° F. or more. The air circulated by the fan 47 causes air to be drawn from the plenum 13, through the duct 18, and into the inlet air chamber 43; upwardly through the low temperature air passage 40 and then downwardly through the other end of passage 40 into the discharge chamber 44 and into the inlet of fan 47. As the air passes through the passage 40, any heat permeating through the insulation 35 of the sheath 27 will be swept away and moved with the air by the fan through the discharge duct 19 and into the plenum 13.

When the sensor 69 and other controls determine that the heat pump is not supplying sufficient heat and when they therefore call for additional heat, the fan 47 is speeded up to its normal operating speed and the damper motor 61 is operated to open the air valves 58 and 54, thereby allowing the fan to draw air through the entrance and exit passages 38 and 39, respectively, and through the air flow openings 28, which traverse the storage brick assembly 24. As hot air is drawn by the fan 47, it is discharged through the duct 19 and into the plenum 13 to add heat to the air flowing from the heat pump 10. As conditions vary and less heat is called for, the motor 61 will be operated to adjust the position of the air valves 54 and 58, to cut down the amount of air drawn through the high temperature entrance and exit air passages 38, 39 and through the air flow openings 28 of the brick assembly. When the temperature conditions in the space being heated have been satisfied, the motor 61 again may be operated to close the air valves 54, 58, thereby terminating the adding of heat from the brick assembly into the air of the heat pump. So long as the fan of the heat pump is operating, the fan 47 continues to operate at least at slow speed as to continue draw air through the low temperature air passage 40 and maintain the outer shell cool to the touch of a person's hand. The outer shell continues to be cool even during full operation of the thermal storage heater because so long as air is being drawn by the fan, at least some of the air will be drawn through the passage 40 under most circumstances.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An electric thermal storage heater comprising
    an assembly of heat storage bricks with a multiplicity of elongate openings traversing the assembly to pass air therethrough to be heated, the assembly having electric resistance heating means therein to heat the bricks,
    enclosure means comprising insulating media and confining said storage brick assembly, said enclosure means defining entrance and exit flow passages to carry air to and from the flow openings, the air flowing longitudinally through the elongate flow openings from the entrance passage to the exit passage,
    fan means moving air through flow passages and openings,
    and the assembled heat storage bricks comprising heated facing surfaces each confronting a facing surface of an adjoining storage brick, one of the facing surfaces of each pair of confronting facing surfaces having an elongate channel shaped recess portion defining a portion of one of said flow openings, said one facing surface also having an elongate supporting shelf portion along one side of the channel shaped recess portion and extending parallel to the direction of air flow in the flow opening, said bricks also comprising end portions through which the recess portions extend, the electric resistance heating means comprising an elongate heating element portion extending parallel to the direction of air flow and lying on the shelf portion and in close proximity to the facing surface of an adjoining brick.

2. An electric thermal storage heater according to claim 1 wherein the heating element also comprises bight portions, additional portions of the supporting shelf portions traversing the end portions of the bricks and carrying said bight portions of the heating element to a shelf portion of an adjoining brick.

3. An electric thermal storage heater according to claim 2 wherein said enclosure means comprises an outer shell portion surrounding a portion of said insulating media and being spaced from said insulating media to define a low temperature airway, and electric supply wires connected with said heating element portions and extending through said insulating media and into said low temperature airway, said heating supply wires being spaced from said flow passage portions.

4. A heat storage brick array for an electric thermal storage heater comprising
   a multiplicity of elongate dense heat storage bricks assembled in end to end and side by side relation and in courses one against the other, adjoining pairs of bricks having facing surfaces confronting each other, one such facing surface of each of the pairs of bricks having an elongate channel shaped recess therein and aligned with a corresponding channel shaped recess of an adjoining brick whereby to define a multiplicity of elongate air flow openings extending through the assembled bricks,
   said one such facing surface also having a shelf portion adjacent said recess and extending therealong, said shelf portion being spaced from the confronting facing surface of an adjoining brick to receive a portion of an elongate electric heating element in close proximity with the shelf portion and the confronting facing surface, said shelf portions also traversing entirely across the ends of the bricks to support bight portions of such heating elements traversing from one brick to another.

5. A heat storage brick array according to claim 4 and also comprising a plurality of elongate electric resistance heating elements being into a substantially sinusoidal shape having a multiplicity of bight portions, each bight portion being adapted to slide in and out of an adjacent pair of air flow openings of the assembled storage bricks.

6. A heat storage brick comprising
   a brick body of heat storing material and having a top surface portion upon which another brick may lie, the brick body comprising an elongate recess through said top surface portion and also comprising a shelf portion extending along the recess to support a portion of the electric heating element, said shelf portion also traversing across the entire end portion of the brick.

7. A heat storage brick according to claim 6 wherein said brick body comprises a second shelf portion also extending along the recess, said shelf portions being disposed on opposite sides of the recess.

8. A heating apparatus comprising
   a heat pump comprising a fan portion, a first outlet duct portion and a heat exchanger portion supplying heat into the air delivered by the fan portion into the first outlet duct portion,
   and an electric thermal storage heater comprising an air heating heat storage brick portion and an electric resistance heating portion heating said brick portion, a second fan portion, a second inlet duct portion and a third heated air duct portion separately connected to the first outlet duct portion of the heat pump to respectively draw air from and return heated air to the first outlet duct portion, the second inlet duct portion being connected to and supplying air to the heat storage brick portion to be heated, said second fan portion and said third heated air duct portion being connected to and drawing heated air from said heat storage brick portion and delivering the heated air into said first outlet duct portion to mix with and increase the temperature of the air from the heat pump supplied to said first outlet duct portion.

9. An electric thermal storage heater, comprising
   an assembly of heat storage bricks with a multiplicity of flow openings traversing the assembly to pass air therethrough to be heated, the assembly having electric resistance heating means therein to heat the bricks, the brick assembly comprising a top portion and a bottom portion,
   enclosure means comprising an insulating media portion confining said storage brick assembly and also comprising an outer shell portion embracing and spaced from said insulating media portion and defining a low temperature airway adjacent the insulating media portion, the airway comprising a bottom air inlet and a bottom air outlet, both the inlet and outlet being adjacent the bottom portion of the brick assembly,
   a pair of upright flow guide panel portions in said low temperature airway between said bottom air inlet and bottom air outlet and said panel portions being spaced from each other to require upward and downward flow of air in the airway, the panel portions comprising top edge portions adjacent the top portion of the brick assembly,
   air supply and discharge means below the brick assembly and respectively connected with the low temperature airway inlet and outlet and adjacent opposite sides of said flow guide panel portions to supply air into one side of the airway and discharge air from the other side of the airway,
   and fan means moving air through said airway and said openings.

10. An electric thermal storage heater according to claim 9 wherein said enclosure means define entrance and exit flow passages connected with the flow openings of the brick assembly, said air supply and discharge means below the brick assembly also being connected to said entrance and exit flow passages, said entrance and exit flow passages extending upwardly and downwardly between the brick assembly and insulating media portion.

* * * * *

UNITED STATES PATENT AND TRADEMARK OFFICE
CERTIFICATE OF CORRECTION

PATENT NO. : 5,086,493
DATED : February 4, 1992
INVENTOR(S) : Paul J. Steffes

It is certified that error appears in the above-identified patent and that said Letters Patent is hereby corrected as shown below: On the title page, Item [54] and Column 1, line 1, . delete "BOOSTED" and insert --BOOSTER--.

Item [57] ABSTRACT and insert the following new ABSTRACT.

An electric thermal storage air heater is connected to the heated air outlet duct of a heat pump for receiving and adding heat to a portion of the air heated by the heat pump and returning the portion of air to the outlet duct. The heat storage heater includes a stacked side-by-side array of bricks wherein at least one face of each brick is shaped to confront the face of an adjoining stacked brick and form an air flow passage therebetween. The same face is provided with an elevated shelf along each side of the passage which carries a length of an electric heating element in engagement with the next adjoining brick so that heat from the element will penetrate both bricks. The heating element is bent into a planar sinusoidal pattern and is insertable into the air passages to rest on the shelves after the array of bricks is assembled.

Signed and Sealed this

Fourteenth Day of September, 1993

Attest:

BRUCE LEHMAN

Attesting Officer   Commissioner of Patents and Trademarks